(12) United States Patent
Pate

(10) Patent No.: US 8,827,245 B2
(45) Date of Patent: Sep. 9, 2014

(54) NON-POWERED DEER HOIST

(76) Inventor: Mitchell D. Pate, Montgomery, TX (US)

( * ) Notice: Subject to any disclaimer, the term of this patent is extended or adjusted under 35 U.S.C. 154(b) by 316 days.

(21) Appl. No.: 13/443,990

(22) Filed: Apr. 11, 2012

(65) Prior Publication Data
US 2013/0270495 A1    Oct. 17, 2013

(51) Int. Cl.
*B66B 9/00* (2006.01)

(52) U.S. Cl.
USPC .................................................. 254/1

(58) Field of Classification Search
USPC ....... 452/187, 188; 414/540; 254/1; 224/157, 224/921; 119/728; 43/58–123; 27/28
See application file for complete search history.

(56) References Cited

U.S. PATENT DOCUMENTS

| | | | | |
|---|---|---|---|---|
| 1,535,208 A * | 4/1925 | Drennan | ....................... | 224/158 |
| 4,529,240 A | 7/1985 | Engel | | |
| 4,767,099 A * | 8/1988 | Munks | ....................... | 254/336 |
| 4,977,643 A * | 12/1990 | Prysock | ....................... | 452/187 |
| 5,423,644 A * | 6/1995 | First, Sr. | ....................... | 410/100 |
| 5,591,077 A * | 1/1997 | Rowe | ....................... | 452/189 |
| 5,713,497 A * | 2/1998 | Ponczek | ....................... | 224/157 |
| 5,803,324 A * | 9/1998 | Silberman et al. | ......... | 224/42.23 |
| 6,626,748 B2 | 9/2003 | Homer, Sr. | | |
| 7,296,959 B2 | 11/2007 | Davis | | |
| 7,544,032 B1 | 6/2009 | Scott, Jr. | | |
| 2009/0233535 A1* | 9/2009 | Boduch | ....................... | 452/187 |
| 2009/0241307 A1* | 10/2009 | Ayers et al. | ................ | 24/68 CD |
| 2010/0111658 A1 | 5/2010 | Galliano et al. | | |

* cited by examiner

*Primary Examiner* — Lee D Wilson
*Assistant Examiner* — Henry Hong
(74) *Attorney, Agent, or Firm* — John J. Love; Claude Cooke, Jr.; Cooke Law Firm

(57) ABSTRACT

A hoist mechanism for raising an animal carcass off the ground includes a pair of strap assemblies. Each strap assembly includes a first ratchet portion attachable to a support member and a loop assembly for grasping a portion of the animal carcass. A handle is provided on each ratchet strap to raise a portion of the carcass off the ground. By alternately raising different portions of the carcass a given distance above ground level, the carcass can ultimately be raised to a position where it can be positioned on a support surface, for example to a rack that is provided on a vehicle.

1 Claim, 2 Drawing Sheets

NON-POWERED DEER HOIST

BACKGROUND OF INVENTION

1. Field of the Invention

This invention relates to a system for hoisting a game animal onto a wheeled vehicle for example after the animal has been killed in a remote area. The system includes two strap assemblies that are attachable to the remote vehicle and the animal in such a manner so as to allow a single person to raise the animal onto the vehicle.

2. Description of Related Art

There are several different types of hoist mechanisms that have been proposed for hoisting game animals onto vehicles. For example in U.S. 2010/0111658 a cradle mechanism and a crank mechanism is provided at the rear of a vehicle for raising the game and placing it on the vehicle. U.S. Pat. No. 6,626,748 proposes a powered lift assembly including a rack and an electric cable winch.

U.S. Pat. No. 4,529,240 discloses an arrangement for dragging game along the ground from a remote area that includes a pair of loop portions for engaging the feet of the animal.

BRIEF SUMMARY OF THE INVENTION

The invention includes two strap assembles each of which has a first end adapted to be attached to an off road vehicle and a second end that includes a loop portion that encircles the carcass. The first end includes a racketing mechanism. The two strap assembles are connected as disclosed and the carcass is raised in a step by step process by a single person in a manner disclosed herein so that the carcass can eventually be raised to a position where it can be supported by a rack assembly or other support which is typically found on an off road vehicle.

BRIEF DESCRIPTION OF THE SEVERAL VIEWS OF THE DRAWING(S)

DETAILED DESCRIPTION OF THE INVENTION

Figure 1:
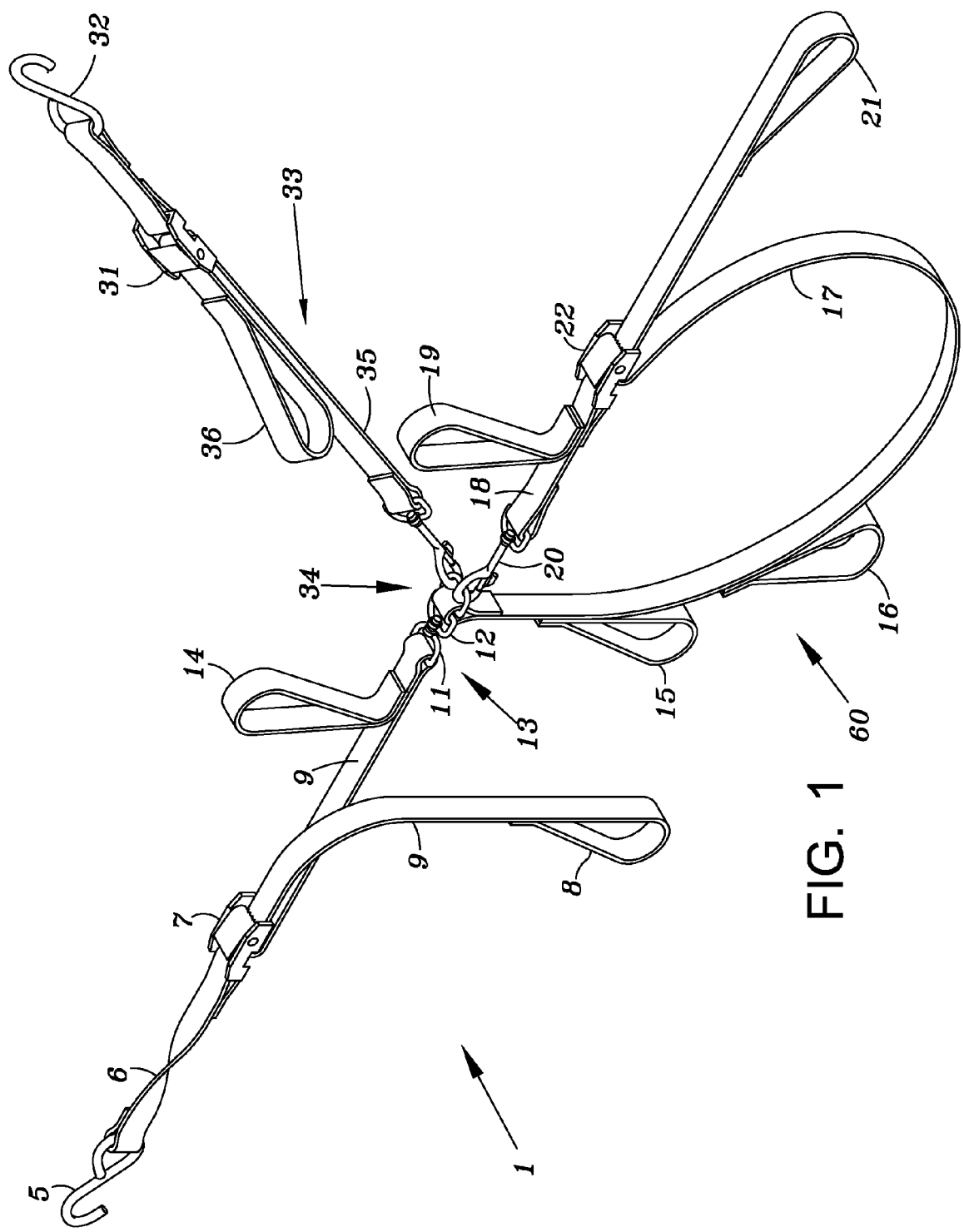
FIG. 1 is a view of a single strap according to an embodiment of the invention.

Referring now to FIG. 1, an embodiment of the invention will now be described in detail.

The strap assembly 1 includes an S-shaped hook member 5 which is adapted to be secured to the rack of an off road vehicle. Any type of attachment device could be used in lieu of hook 5. A first strap section 6 made of a flexible material is secured to the hook member 5 by forming a loop for example. The distal end of the strap portion 6 is suitably attached to a conventional ratchet mechanism 7 that includes teeth that are arranged to allow a second strap 9 to move upward toward the rack but prevent the strap from moving in a downward direction as is well known in the art. Strap member 9 includes a handle 8 formed on the proximal portion of the strap.

The distal end of the strap 9 is attached to a first swivel mechanism 34 that includes two D-shaped rings rotatably connected by a shaft 13. A releaseable clamping mechanism 20 is attached to D-shaped ring 12 and has a third strap portion 18 connected to a rotating element of the clamping mechanism 20. Strap portion 18 is suitably attached to a second ratchet mechanism 22 similar to ratchet mechanism 7.

A fourth strap portion 17 is connected to the ratchet 22 and extends outwardly from the ratchet mechanism to a handle 21 at a first end of strap portion 17. The other end of strap 17 is attached to the D ring 12. Strap 17 may include flexible handles 15 and 16 secured thereto. Straps 17, 18, and ratchet 22 form an adjustable loop 60.

Figure 2:
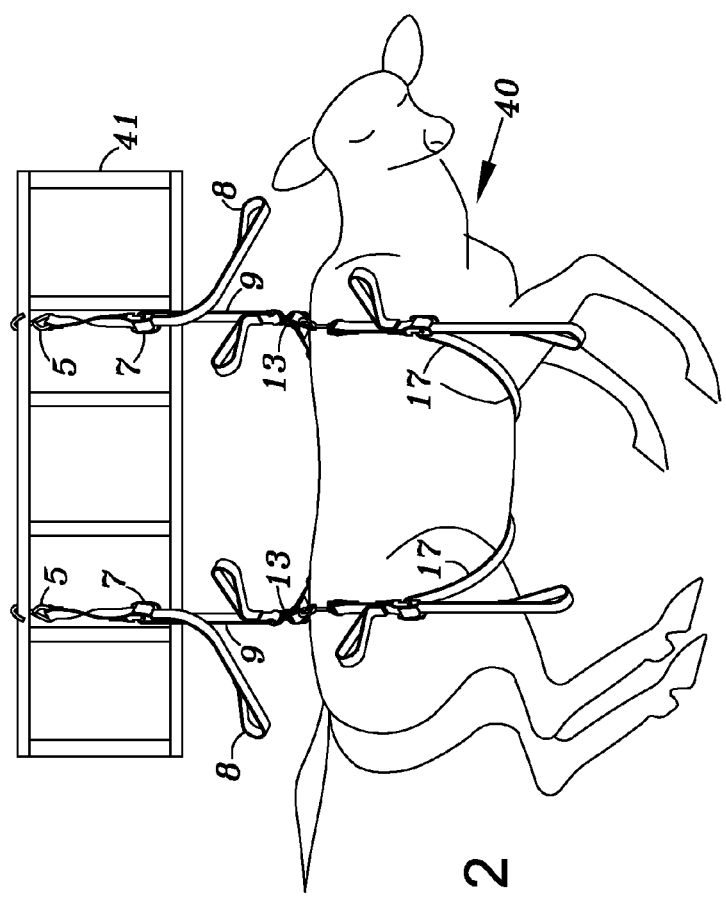
FIG. 2 is a view showing the straps attached at one end to a vehicle and at the other end to a deer carcass.

Thus the distal portion 17 of one of the strap assembles may be positioned around the carcass 40 of the animal as shown in FIG. 2 while a second strap assembly can be positioned about the carcass in a second position.

The device may be used in the following manner. The distal portion including strap portion 18 and 17 are positioned around the body section of the animal's carcass. Handles 21 are pulled until section 17 and 18 are tightly engaging the animal's carcass. The proximal end 5 of the strap assembly is attached to rack 41 which is typically mounted on the off road vehicle. At this point the operator can grasp handle 8 of strap portion 9 to raise the carcass of the animal a given amount. The ratchet 7 will prevent the strap portion 9 from moving backward. Next the operator of the device can grasp handle 14 of strap portion 9 or handle 19 of the strap portion 18, and by lifting, raise the other end of the carcass a given amount off the ground. While lifting, the operator can pull the distal portion 8 of strap 9 to keep the carcass at the given amount off the ground.

This process can be repeated several times until the carcass is raised to a level where it can be rolled onto the support rack of the off road vehicle, by using straps 15 or 16.

As shown in FIG. 1, an auxiliary strap 33 may also be provided that includes a ratchet strap 35 that passes through ratchet mechanism 31 and terminates with a handle portion. 34. A hook 32 can be attached to the ratchet mechanism 31.

Figure 3:
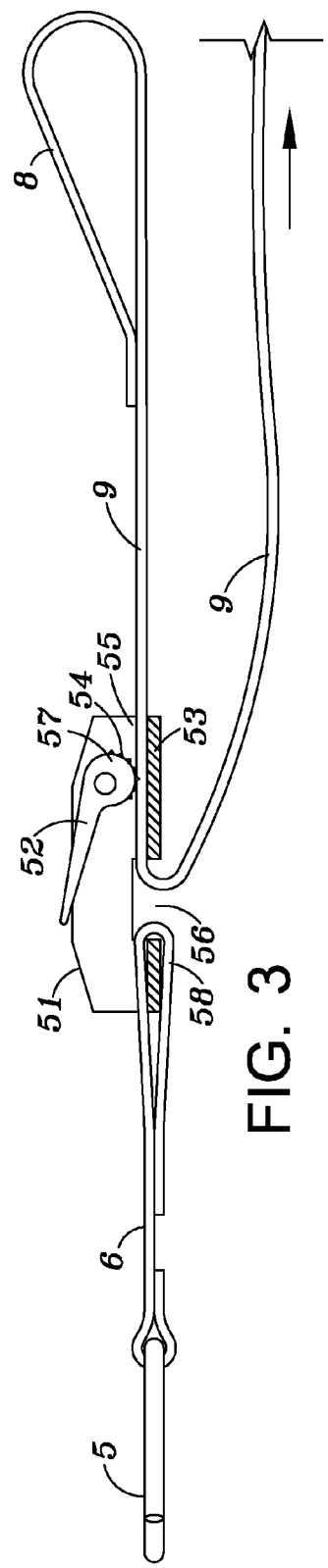
FIG. 3 is a view of an embodiment of a ratchet mechanism for use with the invention.

FIG. 3 illustrates a ratchet mechanism that may be used in conjunction with this invention, although any known mechanism may also be used.

The racket mechanism has a main body portion which includes a front slot 55 through which strap 9 passes. A pivotably mounted pawl 52 has griping elements 54 at one end. The pawl 52 is urged into contact with the upper surface of strap 9 by a coil spring 57 no that strap 9 is movably held in place. Strap 9 exits housing 51 via a slot 56 formed in the lower portion 53 of the ratchet housing. The hook 5 and strap portion 6 can be attached to the ratchet mechanism 51 and one end thereof by a loop 58 formed at one end of strap portion 6.

Although the present invention has been described with respect to specific details, it is not intended that such details should be regarded as limitations on the scope of the invention, except to the extent that they are included in the accompanying claims.

I claim:

1. A method for loading a carcass of an animal located on the ground into a vehicle comprising:
   a) providing a pair of hoist assemblies, each hoist assembly including means for attaching the hoist assembly to a support member on the vehicle, a ratchet mechanism attached to the means for attaching the hoist assembly to a support member on the vehicle, a first strap passing through the ratchet mechanism and having a handle attached to a proximal end of the strap and attached at its distal end to a loop assembly that is adapted to be placed around a body portion of the animal carcass;
   b) positioning the loop portions around a body portion of the carcass;

c) attaching the means for attaching the hoist assembly to a support member on the vehicle of each assembly to a support member on the vehicle;
d) grasping the handle of the first strap of one of the hoist assemblies and raising a first portion of the carcass off the ground a given distance;
e) grasping the handle of the first strap of the second hoist assembly and raising a second portion of the carcass off the ground;
f) repeating steps (d) and (e) until the carcass reaches a vehicle position adjacent the support member on the vehicle; and
g) positioning the carcass on a support surface.

* * * * *